(No Model.)
J. T. SLATER & M. T. BARRETT.
AUTOMATIC LUBRICATOR.
No. 512,402. Patented Jan. 9, 1894.
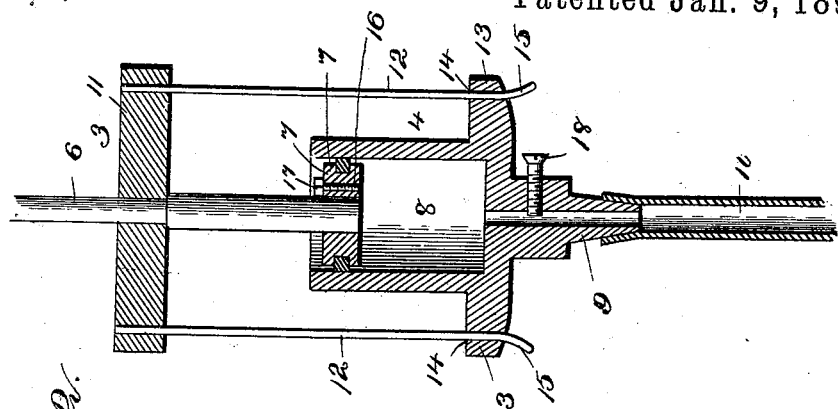
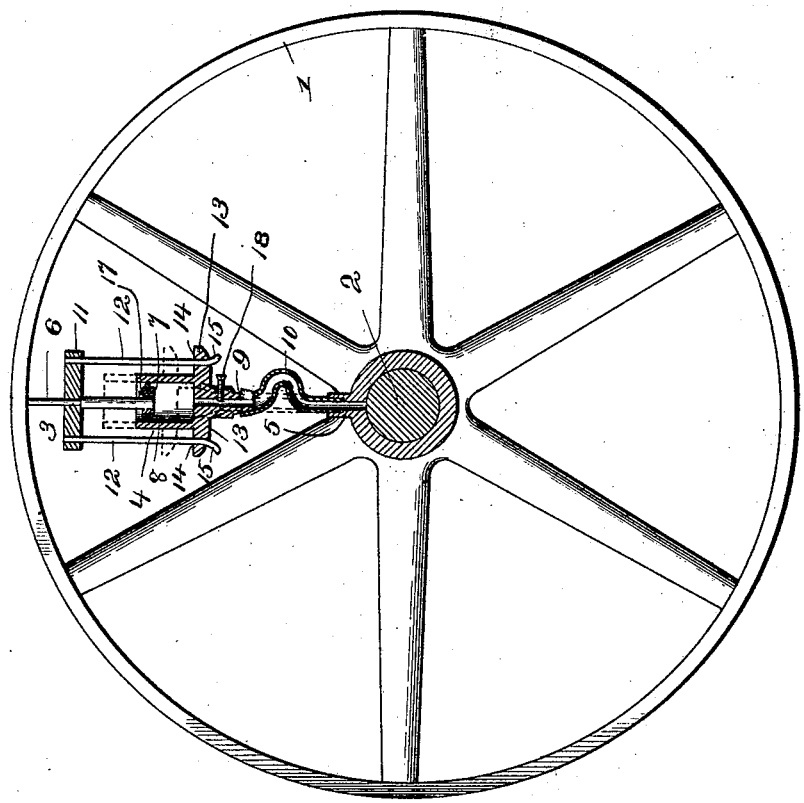
Witnesses
Inventors.
James T. Slater.
Morgan T. Barrett.
by C. A. Snow & Co. Attorneys

UNITED STATES PATENT OFFICE.

JAMES T. SLATER AND MORGAN T. BARRETT, OF BARRETT'S MILLS, OHIO.

AUTOMATIC LUBRICATOR.

SPECIFICATION forming part of Letters Patent No. 512,402, dated January 9, 1894.

Application filed May 11, 1893. Serial No. 473,850. (No model.)

*To all whom it may concern:*

Be it known that we, JAMES T. SLATER and MORGAN T. BARRETT, citizens of the United States, residing at Barrett's Mills, in the county of Highland and State of Ohio, have invented a new and useful Automatic Lubricator, of which the following is a specification.

Our invention relates to improvements in lubricators or oil-cups for use in connection with pulleys, wheels, shafting, &c., where the journals are so arranged as to enable the device to be applied to a rotating part.

The object of our invention is to provide a device from which the oil or lubricating fluid is fed by centrifugal force derived from the rotating wheel, pulley or other part of the machinery.

A further object of our invention is to provide a device which may be readily applied and which will occupy an inconspicuous position whereby it may be arranged in connection with small pulleys and wheels.

A further object of our invention is to provide a device of the class described which shall be simple in construction whereby the liability of displacement and of being rendered inoperative by the accumulation of dust are avoided.

Further objects and advantages of our invention will appear in the following description, and the novel features thereof will be particularly pointed out in the appended claims.

In the drawings—Figure 1 is a sectional view of a device embodying our invention applied in the operative position to a pulley, and showing in full and dotted lines the different positions of the parts. Fig. 2 is a vertical central section of the same, enlarged.

Similar numerals of reference indicate corresponding parts in both views of the drawings.

1 represents an ordinary pulley, such as is found in various kinds of machinery and 2 the shaft or spindle upon which such pulley is mounted.

The lubricator embodying our invention comprises, essentially, two relatively adjustable members, of which the member 3 is attached fixedly to the rim or other permanent part of the wheel, pulley or other rotating part of machinery, and the member 4 is slidably mounted upon the member 3 and is connected by means of a flexible tube to an ordinary oil perforation 5 in the hub of the wheel or pulley or other part.

In the construction illustrated in the drawings, the member 3 consists of a stem 6 which, in this case, is secured at its outer end to the rim of the pulley and at its inner end carries a plunger or piston 7. This plunger or piston head operates in a cylindrical oil cup 8, which forms the body portion of the member 4. This oil cup is provided at its lower end with a nipple 9 to which is connected the outer end of a flexible tube 10, whose inner end is connected to the said oil perforation in the hub of the pulley.

11 represents a cross-head which is attached to an intermediate point of the stem 6, and to its extremities are connected the guide-rods 12 which are arranged parallel with each other and with the sides of the oil cup. The oil cup is provided with lateral ears 13 which are provided with guide-openings 14 which receive the guide-rods 12. The lower terminals of the guide-rods are provided with suitable stops 15 to prevent the displacement or disconnection of the members of the lubricator when detached from the wheel or pulley.

This being the construction of our improved lubricating device, the operation thereof is as follows: The oil cup having been filled with a suitable lubricating fluid through an inlet perforation 16 which is formed in the plunger or piston head and is normally closed by means of a plug 17, the parts occupy the positions shown in full lines in Figs. 1 and 2, in which said piston or plunger is located at or near the outer or open end of the oil cup. The rotation of the pulley or wheel has a tendency to move the oil cup outwardly or toward the rim of the pulley by centrifugal force. This tendency, upon the part of the oil cup, is resisted by friction between the members of the lubricator and by the centrifugal tendency of the lubricating fluid which, in order to allow the oil cup to move outwardly, must pass in an opposite direction through the feed tube to the journal of the pulley. The weight of the oil cup being greater, however, than that of the lubricating fluid and being sufficient in addition thereto to overcome the resistance offered by the friction, said oil cup will gradually move toward the periphery of the wheel and the lubricating fluid will feed through the tube to the journal. When the rotation of the pulley or wheel ceases, and the power by which the oil cup is moved to cause the oil to feed being checked, said oil cup will remain stationary and the lubricating fluid will be held from flowing to the journal. In this way, the lubricator feeds the oil only during the rotation of the pulley and checks the flow of the oil when the motion of the pulley ceases.

In order to regulate the flow of the oil we provide a check valve 18 in the form of a screw, as shown clearly in Fig. 2, which is fitted in a perforation in the nipple 9 and intersects the bore of such nipple at a right angle. If the flow of oil is found to be too free the check valve may be manipulated to close the bore partially.

It will be understood that various changes in the form, proportion, and minor details of construction may be resorted to without departing from the spirit or sacrificing any of the advantages of our invention.

Having described our invention, what we claim is—

1. A lubricator for the purpose named having a plunger provided with a stem which is secured to the rim of a pulley, a cylinder slidably mounted upon said plunger, and a flexible tube connected to the cylinder and communicating with the bearing of the pulley, substantially as specified.

2. A lubricator for the purpose named having a fixed plunger connected to the rim of a pulley, a centrifugally-actuated cylinder slidably mounted upon the plunger, and a flexible tube connected to the cylinder and communicating with the bearing of the pulley, substantially as specified.

3. The combination with a plunger having its stem fixed to the rim of a pulley, and a cylinder slidably mounted upon said plunger and provided with a reduced portion or nipple, of a flexible tube connected to the reduced portion or nipple and communicating with the bearing of the pulley, and means carried by the nipple to regulate and check the flow of lubricant, substantially as specified.

4. In a lubricator for rotatable pulleys, wheels, &c., a fixed plunger, parallel fixed guide-rods arranged parallel with a radius of said pulley or wheel, an oil cup adapted to receive such plunger and provided with guides to operate slidably upon said guide-rods, and means for conveying a lubricating agent from the interior of the oil cup to a suitable opening, substantially as specified.

5. In a device of the class described, the combination with a stem carrying a plunger, and guide-rods arranged parallel with and upon opposite sides of said stem, of a cylindrical oil cup slidably mounted upon said guide-rods to receive the plunger, and a flexible tube communicating with the interior of the oil cup and adapted to be connected to a suitable feed opening, substantially as specified.

6. In a device of the class described, the combination of a plunger having a stem which is secured to the rim of a pulley, parallel guide-rods carried by said stem, a cylinder slidably mounted upon the plunger and provided with guides engaging said guide-rods, and a flexible tube connecting the cylinder to the bearing of the pulley, substantially as specified.

7. In a device of the class described, the combination of a plunger having a stem, guide-rods carried by said stem and provided with terminal stops, a centrifugally-actuated cylinder slidably mounted upon the plunger and provided with guides engaging said guide-rods, and a flexible tube connecting the cylinder to the bearing of the pulley, substantially as specified.

In testimony that we claim the foregoing as our own we have hereto affixed our signatures in the presence of two witnesses.

JAMES T. SLATER.
MORGAN T. BARRETT.

Witnesses:
ALICE E. TAGGART,
R. E. TAGGART.